United States Patent [19]
Chadima, Jr.

[11] Patent Number: 4,788,550
[45] Date of Patent: Nov. 29, 1988

[54] FRONT HOOD ORNAMENT ANTENNA
[76] Inventor: George E. Chadima, Jr., 3624 Skylark La., S.E., Cedar Rapids, Iowa 52403
[21] Appl. No.: 87,367
[22] Filed: Aug. 20, 1987

Related U.S. Application Data
[63] Continuation-in-part of Ser. No. 838,688, Mar. 12, 1986.

[51] Int. Cl.4 .......................... H01Q 1/08; H01Q 1/32
[52] U.S. Cl. ..................................... 343/712; 343/714; 343/715; 343/829
[58] Field of Search ................................ 343/710–713, 343/708, 900, 901, 903, 714, 715, 829, 846

[56] References Cited
U.S. PATENT DOCUMENTS

| | | | |
|---|---|---|---|
| 2,233,920 | 3/1941 | Johnson | 343/713 |
| 2,925,743 | 2/1960 | Wise | 343/903 |
| 3,090,960 | 5/1963 | Ingledew | 343/713 |
| 4,658,259 | 4/1987 | Blaese | 343/713 |

FOREIGN PATENT DOCUMENTS

| | | | |
|---|---|---|---|
| 2701921 | 7/1978 | Fed. Rep. of Germany | 343/712 |
| 2825310 | 12/1979 | Fed. Rep. of Germany | 343/712 |
| 1127480 | 12/1956 | France | 343/714 |

Primary Examiner—William L. Sikes
Assistant Examiner—Michael C. Wimer

[57] ABSTRACT

A mobile radio antenna is provided such that its antenna function may be concealed. This may be accomplished in one preferred arrangement by coupling or blending the mobile radio unit with an oranmental device at the traditional frontal hood-level location. In the case of a luxury automobile, the ornamental device may be designed to enhance the aesthetic appearance of the vehicle. In certain instances, the mobile antenna may include or be associated with an ornament arrangement for receiving any desired indicia (e.g. a company logo) as selected by an individual owner.

15 Claims, 2 Drawing Sheets

U.S. Patent  Nov. 29, 1988  Sheet 1 of 2  4,788,550
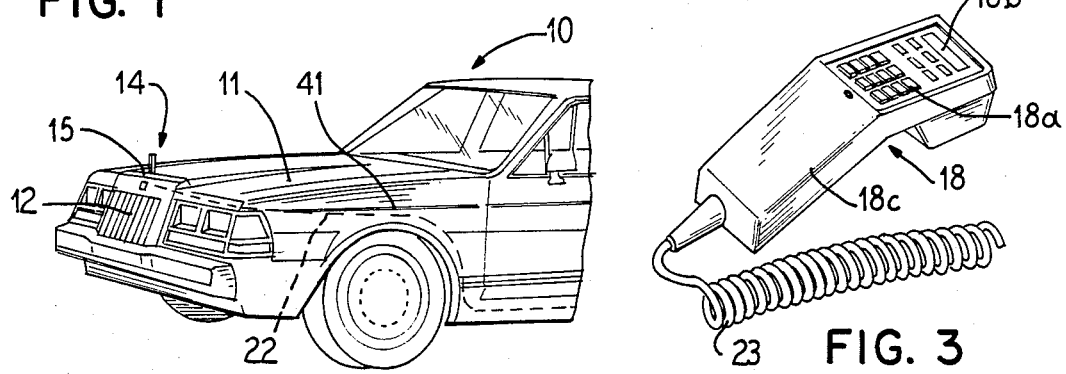
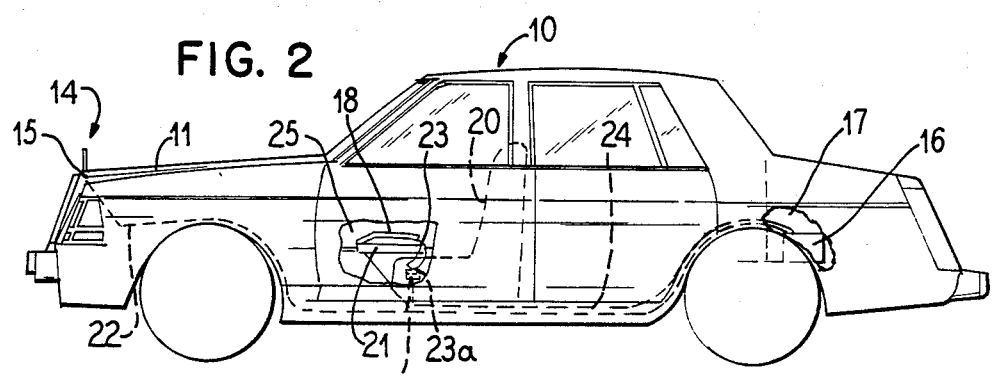
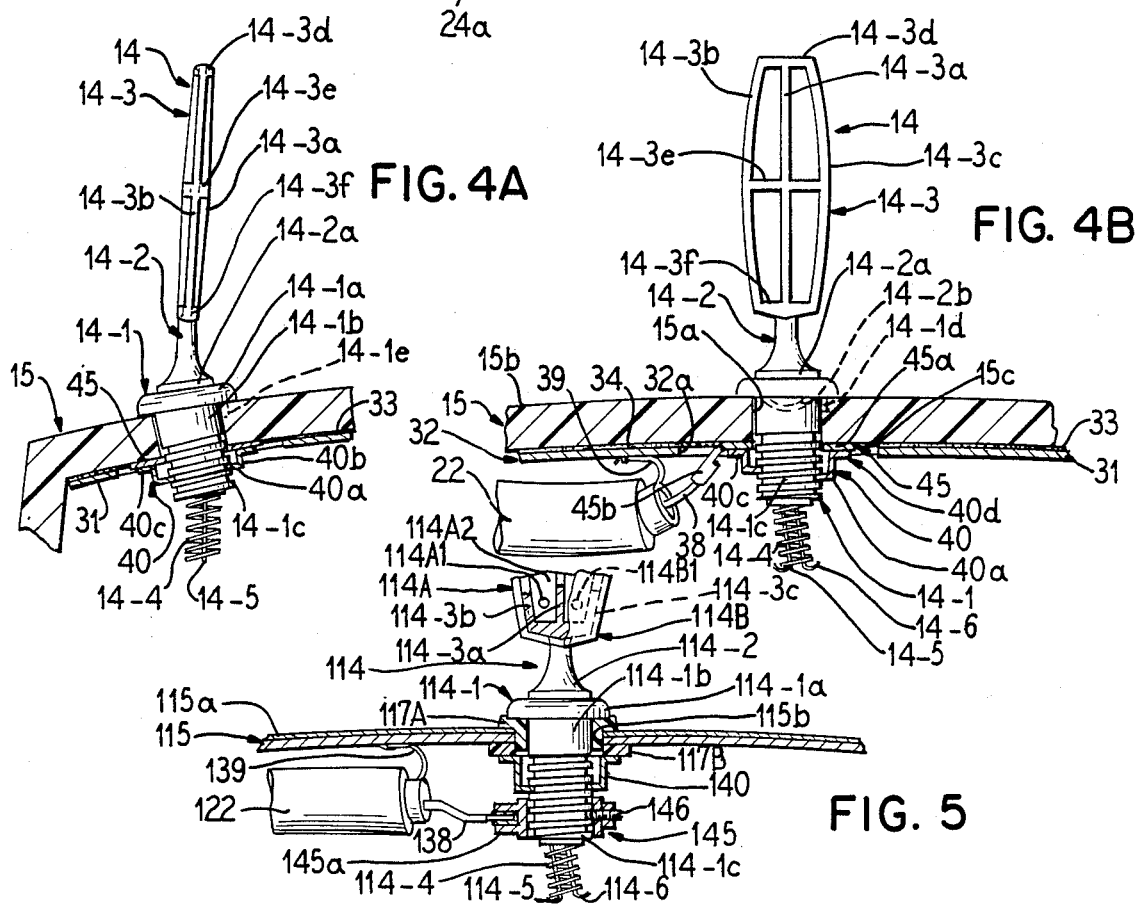

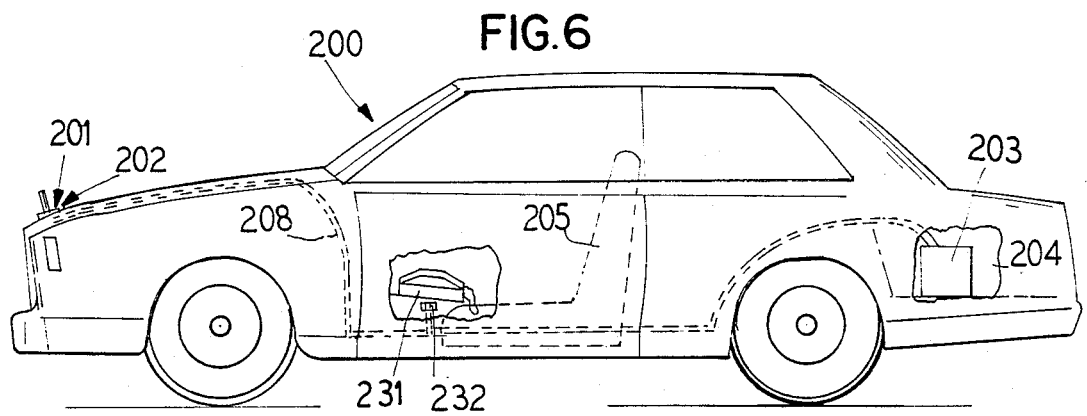
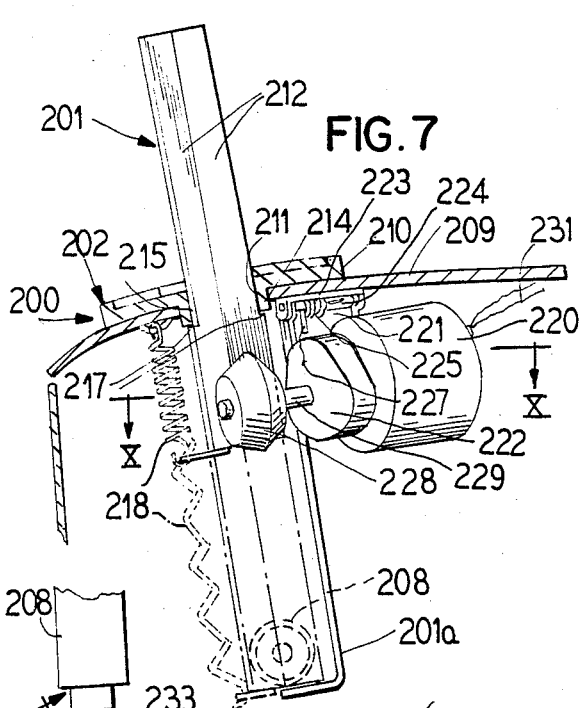
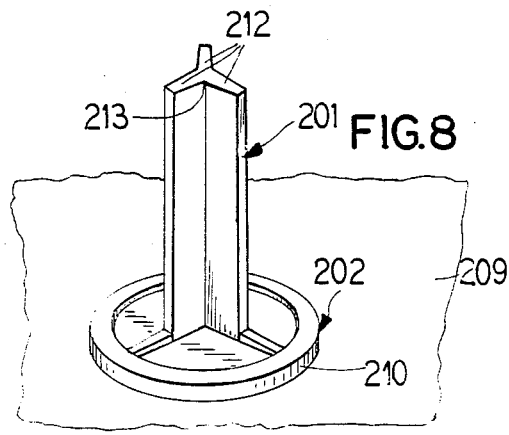
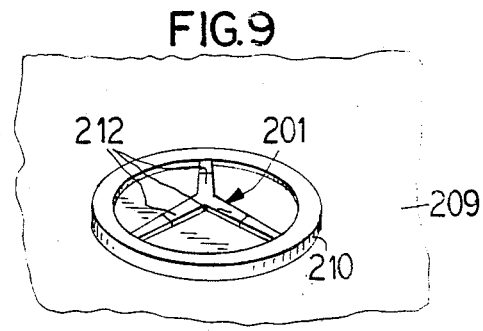
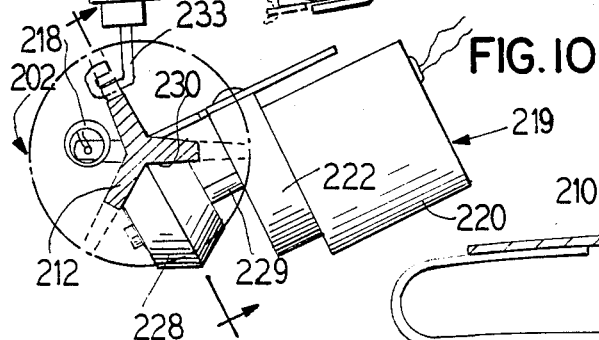
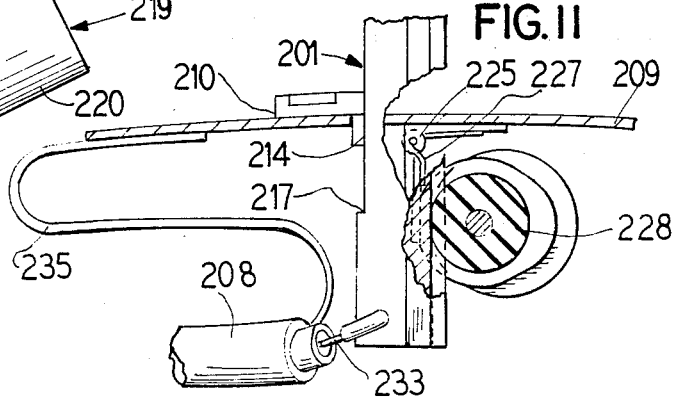

FRONT HOOD ORNAMENT ANTENNA

This application is a continuation-in-part of my pending application Ser. No. 838,688 filed Mar. 12, 1986.

BACKGROUND OF THE INVENTION

Heretofore, in mobile radio systems, automobiles equipped with receiving and/or transmitting equipment have required a special antenna. For example, it has been common to utilize an antenna unit which can be temporarily attached to the exterior of a rear trunk lid. While this may avoid permanently marring the finished exterior of the vehicle, it is a disadvantage that the antenna lead-in lacks a fixed secure path, and is subject to increased wear because of its exposed location. The drilling of a hole at the finished exterior of a luxury automobile is not an attractive alternative because of possible mechanical damage to the finish, increased susceptibility to corrosion, and the like. Furthermore, antennas as heretofore applied to existing vehicles have tended to detract from the originally designed aesthetic appearance.

It is believed that the motivation leading to a removable antenna has been not only ease of application and the avoidance of a permanent detraction from the aesthetic..appearance of the automobile, but also to enable removal of the antenna at times when vandalism to the antenna or theft of the radio unit was a particular danger.

The practice of mounting a mobile radio antenna on the window glass of an automobile and utilizing a capacitive coupling to an interior antenna lead-in is considered to be unsatisfactory because of unsightly appearance, obstruction to the window, the technical problems associated with the capacitive coupling, and the dangers of vandalism and accidental breakage.

It would be particularly desirable if a mobile radio antenna system could be devised which would fully harmonize with the intended aesthetic appearance of the automobile. Also of great utility would be an ornamental device which could serve as a mobile antenna when desired, but which would not be perceived by the public as an atenna, and thus would tend not to reveal the presence of a radio unit in the vehicle. An optimum result is achieved if an existing part of currently produced automobiles can be utilized as an effective mobile radio antenna. In this way, the antenna is a fully harmonized and intended feature of the aesthetic design and is installed during the original production process so as to insure against introducing problems of corrosion, wear, breakage and the like. If an ornamental device can be used as a mobile radio antenna, the presence of a mobile radio system may not be called to the attention of a potential wrongdoer even when such an ornamental device is retrofitted to existing automobiles. Further a frontally located non-obtrusive antenna may have utility in spacial diversity reception systems.

SUMMARY OF THE INVENTION

It is a principal object of the invention to provide a mobile radio system wherein the antenna means has an aesthetic or ornamental appearance and can be disposed at a frontal location at the exterior of the vehicle.

It is a further object of the invention to provide an antenna system for a mobile radio which will be of such a nature as not to call attention to the presence of a mobile radio unit in the vehicle.

Another object is to provide a mobile radio antenna system which may be applied to an existing automobile without detriment to the aesthetic appearance thereof and/or which may be applied in the form of an ornamental device which conceals the antenna function.

A feature of the invention resides in the provision of an ornamental antenna system for a mobile radio system which may be located substantially in a traditional frontal location of the vehicle such that the function of the device as an antenna may be concealed.

Further features of the invention relate to an ornamental antenna means for mobile radio systems which is highly resistant to breakage, to a mobile radio system wherein the antenna means leads through a pre-existing aperture in a frontal wall of a mass-produced automobile, wherein such frontal wall may be of synthetic resin or other dielectric insulating material, and/or to a mobile radio system utilizing a frontally located antenna means where the lead-in from the antenna means is effectively shielded from electromagnetic interference, and is protected from any detrimental effects of wind, engine vibration, road or weather conditions, and the like.

Other objects, features and advantages of the present invention will become apparent from the following detailed description taken in connection with the accompanying drawings, and from the patent claims appended hereto.

BRIEF DESCRIPTION OF THE DRAWINGS

FIG. 1 is a partial somewhat diagrammatic perspective view showing a preferred mobile radio antenna and lead-in system applied to a passenger automobile;

FIG. 2 is a somewhat diagrammatic side elevational view of the automobile of FIG. 1 and indicating the layout of a complete mobile radio system which is associated therewith;

FIG. 3 shows details of an exemplary handset configuration of the illustrated mobile radio system;

FIG. 4A is an enlarged, partial, somewhat diagrammatic, longitudinal sectional view taken at a vertical longitudinally bisecting plane and looking toward the righthand side of the automobile of FIGS. 1 and 2, and showing the lateral appearance of an ornament configuration which may serve as part of a mobile radio antenna system in accordance with the present invention;

FIG. 4B is an enlarged partial, somewhat diagrammatic, transverse sectional view taken looking in a forward direction relative to the automobile of FIGS. 1 and 2, and showing details of a mobile radio antenna and lead-in system according to the present invention;

FIG. 5 shows a somewhat diagrammatic, partial transverse sectional view similar to that of FIG. 4B, for illustrating the mounting for an ornamental antenna means which is to be applied to a vehicle exterior frontal panel of electrically conductive material;

FIG. 6 is a view similar to FIG. 2 but showing a modified automobile configuration;

FIG. 7 is a view similar to FIG. 4A but showing a retractable antenna associated with an ornament configuration;

FIG. 8 is a perspective view of the upwardly projecting portion of the protracted antenna of FIG. 7;

FIG. 9 is a view similar to FIG. 8 but showing the antenna fully retracted;

FIG. 10 is a sectional plan view taken substantially along the line X—X in FIG. 7; and FIG. 11 is a sectional detail view taken substantially along the line XI—XI in FIG. 10.

DETAILED DESCRIPTION

FIG. 1 illustrates an automotive vehicle 10 which is equipped with a mobile radio system. The vehicle may be of the type having an engine compartment at the front of the car which is accessible by the raising of a front hood 11. A heat exchanger (radiator) which forms part of the engine cooling system is located behind a front grille 12. The grille allows air flow to the heat exchanger and is designed to contribute to an aesthetic appearance of the frontal portion of the automobile. To further enhance the appearance of the automobile, an ornament assembly 14 is provided at a frontal ornament location at the front central portion of the automobile and generally at the level of the hood 11. While such ornament assemblies have been mounted on the hood itself, in recent models of automobile, the ornament is mounted on a transverse wall portion 15 which is immediately in front of the hood 11 and which is disposed at a level so as to lie flush with the hood in the normal closed position of the hood.

According to the teachings of the present disclosure the ornament assembly 14 serves as antenna means for a mobile radio system which may further include a transmit/receive radio unit 16 located for example in the trunk compartment 17 at the rear of the automobile, and a handset 18 which may be located adjacent the driver's seat 20 of the vehicle, and may be received in a handset holder 21.

The radio unit 16 is shown as being connected with the ornament assembly 14 by means of a flexible coaxial cable 22 which may extend along a side of the automobile, for example along a path with other electrical wiring as furnished with the automobile as originally produced. Additionally the radio unit 16 may receive operating power from the electrical system of the automobile which may include a twelve volt storage battery and an alternator in the engine compartment at the front of the vehicle 10. The handset 18 is provided with a conventional resilient helically coiled connecting line 23 so that the headset 18 can be lifted from its holder 21 and held in any convenient position by the user when desired. By way of example, the handset 18 may include a desired length of line 23 terminated by a plug connector 23a so that the handset with its line and connector part can be removed from the automobile or otherwise concealed if desired. A suitable extension cable 24 has a connector for connection with the radio unit 16 in the compartment 17 and leads to a mating connector 24a within the passenger compartment 25 which detachably connects with the connector 23a at the end of line 23. The connector 24a may be inconspicuously located, for example at a console between the front seats of the automobile, and the holder 21 may be omitted or disguised, should it be desired to completely conceal the presence of the mobile radio system.

The handset 18 as shown in FIG. 3 may be a commercially available type with a lighted keypad 18a and an LCD display 18b at one side, and projecting earpiece and speaker sections at an opposite side which function as a hand held telephone when the handset is gripped at region 18c. The keypad 18a includes the conventional arrangement of telephone pushbuttons for entering a desired telephone number. The handset may accomodate off-channel dialing so as to permit entry of a complete dialing sequence before activating the transmitter, thus minimizing "on-the-air" time. Also frequently used number sequences, e.g. up to fifteen. digits each, may be stored in a built-in memory for quick recall. Each of the twelve telephone keys may control an additional function when used in conjunction with an auxiliary function key of the keypad 18a. For example, the sixth digit key may control a last number retry function when actuated in conjunction with the auxiliary function key. The handset 18 may weight about one pound.

FIGS. 4A and 4B basically correspond with a decorative antenna system which has been successfully operated, but illustrates minor refinements. The ornament assembly 14 is commercially available as Ford Motor Company part number E45Y-16850-A. and is present on the 1984 Lincoln Continental automobile shown in FIGS. 1 and 2 as it is commercially sold. The ornament assembly comprises a fixed base 14-1, and an ornament pedestal 14-2 with an integral ornament configuration 14-3. The parts 14-2 and 14-3 are capable of being jointly angularly deflected against the action of a helical spring 14-4. The pedestal 14-2 includes a flange 14-2a which engages flatwise with an annular surface of the base 14-1, and a depending loop 14-2b which receives the upper hooked ends of two wire rods 14-5 and 14-6. The rods 14-5 and 14-6 extend through a hollow bore of the base 14-1 and within the helical spring 14-4, and have lower outturned hooked ends engaging a lower end of the spring 14-4.

The ornament configuration 14-3 is designed to aesthetically harmonize with the grille 12 and with the general proportions and contours of the automobile. The configuration 14-3 includes a vertically disposed central blade 14-3a, laterally adjoining framing elements 14-3b and 14-3c and upper, intermediate and lower framing elements 14-3d, 14-3e and 14-3f.

Part 14-1 and the integral parts 14-2 and 14-3 are individually provided with a heavy bright metallic coating on all exterior surfaces, so that the undersurface of flange 14-2a and the upper annular receiving surface of base 14-1 are firmly held in excellent conductive contact by the spring 14-4 under normal conditions.

The ornament assembly extends through a pre-existing aperture 15a in the transverse wall 15 of the vehicle as shown in FIG. 4B. The frontal wall 15 is of dielectric insulating material, with the upper enlarged diameter tubular end 14-1a of the base being seated directly at the external finish coating 15b of wall 15. The base part 14-1 further includes a tubular shank portion 14-1b fitting snugly within the aperture 15a and a helically grooved tubular portion 14-1c depending below the undersurface 15c of wall 15.

In order to retrofit the commercially furnished automobile, in accordance with the illustrated embodiment of the present invention, a pair of electrically conductive ground plane strips 31 and 32 are applied to the undersurface 15c of the dielectric transverse wall 15 at each lateral side of the aperture 15a as indicated in FIG. 4B. Specifically adhesively backed copper sheets were used, the adhesive layers being indicated at 33 and 34.

In a first example as actually implemented, an extension of a center conductor 38 of the flexible coaxial cable 22 was securely wrapped about the base 14-1 where it protrudes below the undersurface 15c of the dielectric transverse wall 15 so as to make permanent electrical contact with the metal coating at the exterior of base 14-1. The electrically conductive surfaces of the ornament assembly 14 above the ground plane provided by strips 31 and 32, are found to provide an effective antenna for radiating and receiving radio signals in the eight hundred megahertz band. Coupling with the coaxial cable 22 is effected by means of the connection of the center conductor 38 with the metallic surfaces of antenna 14 and by connection of the flexible outer conductor sheath 39 of the cable with the ground plane strips 31 and 32.

In the commercially available ornament assembly 14, a lock nut 40 has a generally cup shape include a bottom portion 40a with segmental inner edges arranged to engage in the helical groove of base portion 14-1c. The side 40b of the lock nut may have a hexagonal shape so as to receive a wrench for applying a rotational torque. An outturned upper lip 40c of the nut may have notches and may be shaped to provide locking teeth such as 40d. In the first example which differs slightly from the illustration of FIGS. 4A and 4B, the locking teeth 40d grip the undersurface 15c and securely lock the nut 40 in its final tightened position. The extension of the center conductor 38 of the coaxial cable is pressed between the lip 40c and the undersurface 15c during tightening of the nut 40 so that the electrical connection between center conductor 38 and the exterior of base 14-1 is protected from strain. The coaxial cable 22 is secured to a front wall of the vehicle close to the electrical connections of the inner and outer conductors 38 and 39 with the antenna system to further insure against strain being placed on the connections. The inner conductor 38 is sufficiently stiff so that it will maintain the selected lead-in contour (e.g. generally as shown in FIG. 4B) and will extend with a desired clearance from the edge 32a of the ground plane strip 32. In the first example, the coaxial cable extends laterally from the ornament assembly 14 along the front of the vehicle at a relatively constant spacing beneath the transverse wall 15 to the extreme left side of the vehicle. Thereupon the cable 22 has a generally horizontal bend so as to extend rearwardly beneath a side wall 41, FIG. 1, at the extreme left side of the vehicle. The path of the coaxial cable 22 is indicated by a dash line in FIGS. 1 and 2.

In a second example, as a refinement of the first example, an electrical connector 45, FIG. 4B, has a metal washer like body 45a which fits between the lock nut 40 and the panel 15, as is actually shown in FIGS. 4A and 4B. The body 45a has an integral receiving socket 45b which receives the inner conductor 38 and which may have a crimped connection therewith. The socket 45b is located to be clear of the lip 40c of the lock nut 40, and so as to extend in spaced relation to the edge 32a of the ground plane strip 32. The lock nut 40 may be of metal such as to insure a good electrically conductive path between the external conductive coating of part 14-1c and the body 45a of the electrical connector 45. The body 45a may have peripheral notch portions with locking edges for gripping the undersurface 15c of the panel 15, and the gripping edges such as 40d may be located radially inwardly of the peripheral notch portions of body 45a, so that parts 40 and 45 are reliably interlocked against counterclockwise rotation, once lock nut 40 has been tightened in place.

For a mobile radio system according to the first example which has been successfully tested, in a transmit mode of operation, the radio unit 16 generates a selected carrier signal in the eight hundred megahertz frequency band which is transmitted via the coaxial cable 22 to the ornament assembly 14 which serves as radiating antenna. In order that the system may transmit over any of a number of different channels, the radio unit 16 is provided. with programmable means for synthesizing any of a large number of carrier frequencies, for example in the band extending from 811.0000 MHz to 820.9875 MHz. In this exemplary radio unit 16 which is designed for a commercial trunked mobile radio system, a two hundred channel capacity is available with synthesized frequencies in the eight hundred megahertz frequency band which are readily field programmable. In the transmit mode, coded tone signals are generated by the actuation of pushbuttons of the keypad 18a, FIG. 3, and corresponding frequency modulation signals are transmitted via a selected channel. When the desired party has been reached, e.g. via a telephone system connected with a receiving base station, the user may carry on a telephone conversation via the handset. By way of example, the exemplary commercial radio unit of the first example provided RF power output of fifteen watts and required a battery drain in transmit mode of 8.5 amperes at 13.6 volts DC. The channel spacing was twenty-five kilohertz. The RF output impedance was fifty ohms. Conducted spurious and harmonic emission was minus sixty decibels. Modulation deviation was ±5.0 kilohertz. Frequency stability was ±0.00025%. Audio distortion was less than three percent at one thousand hertz. Maximum frequency separation was five megahertz.

Referring to the first example, in the receive mode, incoming signals were in one of the following frequency bands: 861.0125 to 865.9875 MHz, 856.0125 to 860.9875 MHZ and 856.000 to 860.9750 MHz. Each receive channel was separated from a corresponding transmit channel by forty-five megahertz. The RF input impedance was fifty ohms. The channel spacing was twenty-five kilohertz. The receiver had the same frequency stability as the transmitter of ±0.00025%. Modulation acceptance was plus or minus seven kilohertz. Intermodulation was minus sixty-eight decibels. Spurious and image rejection was minus seventy decibels. Audio output was three watts with five percent distortion (1000 Hz reference). The frequency separation was five megahertz maximum.

In the second example according to FIGS. 1-3, 4A and 4B, components 16 and 18 operate in conjunction with a cellular mobile radio system. Transmission of voice and data signals may take place with a carrier frequency in the band from 825 MHZ to 845 MHz. Phase modulation, for voice transmission, is employed with a peak frequency deviation of plus or minus twelve kilohertz. The emission bandwidth is near thirty kilohertz, and adjacent channels are never used in any given cell to allow a thirty kilohertz spacing between channels. Binary coded data messages for system control are transmitted at a twenty kilobaud rate using Manchester coding. Direct binary frequency shift keying of the RF carrier is employed with a peak frequency deviation of plus or minus eight kilohertz. The emission bandwidth for data transmission closely approximates that for speech. A typical mobile transmitter generates about three watts output. In receive mode, signals are received in a band from 870 MHz to 890 MHz, respective send and receive duplex channels being separated by forty-five megahertz. For example, if the transmit carrier is at 830 MHz, the receiver passband will be centered at 875 MHz. There may be 666 duplex channels available. A common phase-modulator/frequency discriminator is employed for both data and voice transmission/reception. The receiver produces a twelve decibel SINAD (i.e. ratio of audio signal plus noise plus distortion to noise plus distortion) with an input power of −116 dBm where the mobile antenna gain averages a few decibels over an isotropic radiator (dBi).

Specific exemplary parameters for the first example are as follows:

Antenna 14

Height of antenna 14 above the plane of copper strips 31,32—about 9.5 centimeters Width at level of 14-3d and 14-3f—about 1.7 centimeters Width at level of 14-3e—about 2.5 centimeters Thickness of 14-3a at level of 14-3e—about one centimeter Thickness of 14-3a at the levels of 14-3d and 14-3f about 0.5 centimeter Overall length of 14-3—about 6.8 centimeters Overall length of 14-2—about two centimeters Overall length of 14-1—about three centimeters Manufacturer's designation:

Ford Motor Company part number E45Y-16850-A

Ground Plane Strips 31,32

Copper strips each three inches wide by twelve inches long (7.6 centimeters × 30.5 centimeters)

Coaxial Cable 22

Manufacturer's designation: Belden Electronic Wire & Cable, 8/U type, low noise coaxial cable Trade and UL type number: 8214*; 1354, 80C *(passes the VW-1 vertical wire flame test)

Center conductor: No. 11 AWG; stranding, 7×19; diameter, 2.74 millimeters; bare copper; 3.8 ohms per kilometer Dilectric: cellular polyethylene; nominal core outside diameter, 7.24 millimeters Jacket: black polyvinyl chloride (PVC); nominal outside diameter, 10.29 millimeters Inner shield: bare copper; 3.6 ohms per kilometer; shield coverage, 97%

Nominal impedance: 50 ohms

Nominal velocity of propagation: 78%

Nominal capacitance: 85.3 picofarads per meter

Nominal attenuation: 22.0 decibels per 100 meters at 900 megahertz

FIG. 5 shows a modification of the embodiment of FIGS. 4A and 4B wherein an ornament assembly 114 is applied to a metal panel 115 having an exterior finish coating 115a and having an aperture 115b therethrough. The panel 115 may be disposed at a frontal hood level corresponding to the location of the panel 15, FIGS. 1 and 2, and the aperture 115b may be formed at a front central location substantially corresponding to the traditional hood ornament location of a passenger automobile as shown for ornament assembly 14 in FIGS. 1 and 2.

FIG. 5 may be taken as illustrating the use of an ornament configuration with electrically conductive central upstanding portions 114-3a, 114-2 and 114-1 which have a height above the plane of panel 115 so as to serve as an antenna configuration for the frequency bands above 800 megahertz as previously given for the first and second examples herein. By way of example lateral framing elements 114-3b and 114-3c may have the same general configuration as shown in FIGS. 4A and 4B. Instead of an intermediate horizontal element such as 14-3e, FIGS. 4A and 4B, the elements 114-3a, 114-3b and 114-3c may receive various individualized insignia or logos, as may be desired by the owner of the vehicle. For example, ornament parts 114A and 114B are indicated as embracing and interfitting with the elements 114-3a, 114-3b and 114-3c, and having interlocking means, such as pins 114A1 of part 114A which have a force fit with receiving holes such as 114B1 of part 114B to securely retain the ornament parts in a fixed relationship to the ornament assembly 114. The parts may have respective land areas such as 114A2 which fit in abutting relation to each other when the mating parts are fully interlocked and which conform to the respective recesses between metal upright 114-3a and each side frame element 114-3b and 114-3c. Thus when the ornament parts 114A and 114B have been applied to assembly 114, they are rigidly locked therewith against any relative vibration. The ornament parts are formed of insulating synthetic resin material with essentially negligible dielectric loss in the eight hundred megahertz band. The parts 114A and 114B may be free of any electrically conductive coating or the like, so that only the conductive coating on parts such as 114-1, 114-2 and 114-3a functions as an antenna. By way of example, panel 115 may be part of the hood of a delivery vehicle, in which case, the logo of the company owning the vehicle may be embossed into the exterior of the frontal ornament part 114A, or into the exterior of both parts 114A and 114B. In other instances, the individual ornament means 114A and/or 114B may receive the initials or other personal indicia selected by the owner or operator of the vehicle.

The metallic parts 114-1a, 114-1b and lock nut 140 may be suitably insulated from the grounded metal panel 115. For example, finish coating 115a may be of dielectric insulating material and may be applied after formation of aperture 115b so as to cover the edge of aperture 115b and the underside of panel 115 with a thickness to provide the required electrical insulation. Otherwise as actually shown in FIG. 5, insulating grommet parts 117A and 117B may be applied to provide an insulated aperture for receiving the part 114-1. In any event, a coaxial cable 122, corresponding with cable 22 previously described, has its center conductor 138 suitably connected to part 114-1c and its electrically conductive shielding 139 connected directly to the metal of panel 115 as shown in FIG. 5.

Simply by way of example, a collar 145 is shown as threadedly engaging the lower end of part 114-1c and held in fixed conductive connection therewith by means of a set screw 146. A receptacle part 145a of collar 145 may be crimped to the center conductor 138 to establish the desired electrical coupling between center conductor 138 and the antenna elements 114-1, 1142 and 114-3a.

The parts 114-2 and 114-3 may comprise a unitary metal part and may be pivotal on part 114-1a against the action of helical spring 114-4; and a depending loop on part 114-2 corresponding to depending loop 14-2b, FIG. 4B, may be engaged with the upper ends of wire rods 114-5 and 114-6 as in FIG. 4B. The lock nut 140 may correspond exactly with lock nut 40, FIG. 4B, except that the locking teeth of nut 140 engage an insulating layer at the underside of panel 115, or as actually shown, engage with grommet part 117B.

Where the metal panel 115 is part of the hood which can be pivoted to a raised position to provide access to the engine compartment of the vehicle, the coaxial cable 122 may extend laterally along a front edge of the panel 115 and then curve so a to extend rearwardly along the left edge of the hood. The coaxial cable may then curve downwardly at the rear of the engine compartment and extend from the rear of the hood to an adjacent fixed part of the vehicle such that the hood can be pivoted between closed and open position without disturbance to the cable mounting. The path, of coaxial cable 122 may thereafter generally correspond with that of other wiring in the vehicle, and extend to a radio transceiver location under or to the rear of the vehicle driver's seat.

The commercially available component 14 is provided with pins such as indicated at 14-1d, FIG. 4B, and 14-1e, FIG. 4A, which fit into receiving holes of panel 15. The corresponding part 114, FIG. 5, may have similar pins registering with corresponding receiving holes in grommet part 117A to interlock parts 114-1 and 117A against relative angular movement. The part 117A may have projecting pins corresponding to pins 14-1d, 14-1e, and such pins may project through holes in the metal plate 115 and be engaged in receiving holes in part 117B with a friction fit such that parts 114, 117A and 117B are positively interlocked with the metal plate 115 and held against angular displacement.

In the embodiment of FIG. 5, a means is provided whereby the antenna function of assembly 114 is concealed, both because of the location of the assembly at the traditional hood level frontal ornament location and because of the substantial deviation of the configuration of assembly 114 from that of a monopole mobile antenna. The term "ornamental antenna means" is intended to refer to an assembly such as 14 or 114 which avoids the simple monopole appearance and has a substantial tendency to conceal the antenna function. Where there is a desire to identify or personalize a vehicle, the ornamental antenna means located at the traditional hood level frontal ornament location provides for the mounting of individualized ornament means such as represented by parts 114A and 114B, FIG. 5, which may identify or be individually selected by the owner or operator of the vehicle.

The embodiments disclosed in FIGS. 1–5 have a laterally extended frame means such as provided by parts 14-3b to 14-3f in FIG. 4B and by parts 114-3b and 114-3c in FIG. 5, which may mechanically interlock with individualized ornament parts such as indicated at 114A and 114B in FIG. 5 and provide a secure support therefor. The relatively wide frame means prevents angular movement of the ornament parts about the axis of the main antenna portion 14-3a or 114-3a. The antenna will not be disturbed when the vehicle is passed through an automatic car wash. The antenna is completely below the level of the roof of the vehicle, so that its clearance height is unchanged. The entire roof area is available for any desired cargo without danger of damage to the antenna.

All of the parameters given for the first and second examples herein, are applicable to FIG. 5 as well as to FIGS. 4A and 4B. The height of the antenna means above the ground plane is not substantially greater than ten centimeters and is preferably less than ten centimeters. The width of the ground plane strips 31 and 32 is preferably not greater than about ten centimeters. In a preferred example, the conductive strips have a width dimension so as to extend at least about three centimeters in front of and at least about three centimeters behind the metallic antenna means. The maximum width of the antenna means including its frame parts is preferably at least about 1.5 centimeters but not greater than about three centimeters.

In the modification depicted in FIGS. 6–11, an automotive vehicle 200 is equipped with a mobile radio system substantially the same as the already described system except that a retractable or disappearing antenna 201 is provided which is particularly adaptable for vehicle configurations such as typically present in Mercedes-Benz automobiles having a relatively flat frontal medallion-like ornament 202 (FIGS. 6 and 7).

Similarly as in the vehicle 10 in FIG. 2, the vehicle 200 may have a transmit/receive radio unit 203 located in the customary rear trunk compartment 204, and a handset, similar to the handset 18 in FIG. 3, which may be located adjacent to the customary driver's seat 205 of the vehicle 200 and may be carried, when not in use, in a handset holder 207. A flexible coaxial cable 208 connects the radio unit 203 operatively to the antenna member 201. For details related to the handset (18) references made to the detailed description in connection with FIGS. 2 and 3 and which description is equally applicable to FIG. 6.

Typically, the ornament 202 is mounted on transverse wall portion of the automobile 200, forwardly from the customary hood of the automobile. To this end, the ornament 202 which comprises a disk-like medallion 210 is secured in any preferred customary manner to the upper side of the wall 209. Centrally the disk member 210 has an aperture 211 complementary in shape to the antenna member 201 and providing a bearing for longitudinal sliding guidance of the antenna member 201. Although the antenna member 201 may be of any preferred cross-sectional configuration, in the illustrated preferred construction, it is in the form of a three vane bar shape provided with three longitudinally or axially extending equidistintly spaced radially projecting flanges or vanes 212 joined at a center 213 and providing the body of the antenna member 201. The bearing surface within the aperture 211 may be extended by means of a depending flange structure 214 on the disk member 210 and which extends downwardly through a complementary hole 215 in the wall 209.

Overall length of the antenn bar 201 is such that in its fully projected position as seen in FIGS. 7 and 8, a substantial length of the antenna bar will project substantially above the disk member 210 while a substantial control or base length portion of the antenna bar remains concealed below the wall 209. For determining the projected length of the antenna bar 201, lateral upwardly facing shoulders 217 on the vanes 212 are arranged to engage as stops against the lower, inner edge of the disk flange 214.

Means are desirably provided for normally biasing the antenna rod 201 into raised or protracted position. In a desirable arrangement, the biasing means may comprise a spring 218, herein shown as of the tension type attached at one end to the lower end of the antenna bar 201 and attached at the opposite end to the inner side of the wall 209 (FIG. 7). Thereby, the spring 218 provides a continuous upward, protracting bias to the antenna bar 201.

For selectively retracting the antenna 201, motorized means 219 may be provided, herein comprising an electrical motor 220 (FIGS. 7 and 10) mounted as by means of a bracket 221 which is rigidly fixed to a gear reduction housing 222 on the front end of the motor 220 and is pivotally carried by a mount 223 fixed to the wall 209. An axle 24 journaled to the mount 223 has wrapped thereabout a torsion spring 225 which has a biasing arm 227 which engages the bracket 221 and biases the motorized means 219 generally against the lower portion of the antenna rod. Thereby a dielectric drive wheel 228 mounted on a drive shaft 229 of the motor 220 is caused to engage its annular generally wedge-shaped driving perimeter complementally into one of the grooves 230 in the antenna rod 201. Motor actuated raising and lowering of the antenna rod 201 in the apperture 211 of the disc 210 can therefore be effected by appropriately operating the reversible motor 220 by means of an electrical circuit 231 controlled by means of a switch 232 conveniently located in the driver's compartment of the vehicle 200. Fully extended, the antenna rod 201 will appear substantially as shown in FIG. 8. When fully retracted, only the tip of the antenna rod 201 may appear as shown in FIG. 9 where it substantially blends unobtrusively with the design of the ornamental member 202. In the fully retracted position of the antenna rod 201, its lower end is stopped against a stop 201a which may be formed of dielectric material if desired. When it is desired to protract or extend the antenna rod 201 the biasing spring 218 cooperates with the appropriately actuated driving wheel 228 to overcome any resistance to such action.

Electrical connection of the antenna rod 201 with the radio set 203 is desirably effected by securing a lead 233 (FIGS. 10 and 11) from the coaxial cable 208 by means of an electrical terminal 234 to a lower end portion of the antenna rod 201. A flexible grounding loop 235 connects the coaxial cable 208 to the vehicle body through the wall 209. Through this arrangement the driver of the vehicle 200 is enabled to extend or retract the antenna rod 201 at will by operating the switch 232. Especially when extended, the antenna rod 201 provides an effective antenna for radiating and receiving radio signals. When not in use, the antenna rod 201 is advantageously retracted into a virtually hidden, or at least unobtrusive position wherein it is fairly safe from tampering and is completely out of the way of car washing or polishing apparatus or cloths.

While several preferred embodiments have been illustrated and/or described in detail, it will be apparent to those skilled in the art that many changes and modifications may be made without departing from the disclosed invention in its broader aspects; and it is intended that the appended claims cover all such changes and modifications as fall within the spirit and scope of the novel concepts of the present invention.

I claim as my invention:

1. In a radio system,
a mobile vehicle having a front hood portion with
  an opening at a front hood ornament location, radio means carried within the vehicle, a front hood ornament which comprises an antenna means mounted on said vehicle front hood portion and extending through said opening,
  and said hood ornament being of metal, and operable as an antenna in a frequency range above eight hundred megahertz,
radio signal transmission means coupling said metal hood ornament antenna with said radio means,
a ground plane conductive means adjacent said hood ornament but insulated therefrom,
said radio transmission means having a ground plane feed conductor and an antenna feed conductor and said antenna feed conductor electrically connected to said front hood ornament and said ground plane feed conductor electrically connected to said ground plane conductive means.

2. A radio system according to claim 1, with said front hood portion of the vehicle having a vehicle front wall with a finish coating providing part of a finished exterior of the vehicle, said antenna feed conductor, and said radio signal transmission means being disposed essentially entirely within said vehicle.

3. A radio system according to claim 1, with said front portion of the vehicle being of dielectric insulating material of negligible loss at 800 megahertz and having an interior side within the vehicle, and said ground plane conductive means applied to said interior side of said frontal portion of the vehicle in the vicinity of said antenna means.

4. A radio system according to claim 3, with said ground plane conductive means comprising conductive strip means extending transversely along the interior side of the vehicle front portion at each side of the antenna means and havng a width dimension disposed in a fore-aft direction of the vehicle.

5. A radio system according to claim 4, with said conductive strip means having a width dimension so as to extend at least about three centimeters in front of and at least about three centimeters behind the antenna means.

6. A radio system according to claim 5, with said conductive strip means having a width dimension of not more than ten centimeters.

7. A radio system according to claim 6, with said antenna means extending to a height of not more than about ten centimeters above a plane of the ground plane conductive means.

8. A radio system according to claim 1, wherein said antenna means comprises a rod-like member, means for guiding said member between a protracted position and a retracted position, and an actuator for selectively driving said member to and between said positions.

9. A radio system according to claim 8, wherein said frontal hood ornament location includes a dielectric ornament guide for said member.

10. In a radio system according to claim 1 wherein said front hood portion is electrically conductive and forms said ground plane conductive means and said front hood ornament is insulated from said front hood portion.

11. In a radio system, a mobile vehicle having a front hood portion with an opening at a front hood ornament location, radio means carried within the vehicle, a front hood ornament which comprises an antenna means mounted n said vehicle front hood portion and extending through said opening, and said hood ornament being of metal, and operable as an antenna in a frequency range above eight hundred megahertz, radio signal transmission means coupling said metal hood ornament antenna with said radio means, a ground plane conductive means adjacent said hood ornament but insulated therefrom, said radio transmission means having a ground plane fed conductor and an antenna feed conductor and said antenna feed conductor electrically connected to said front hood ornament and said ground plane feed conductor electrically connected to said ground plane conductive means, wherein said antenna means comprises a rod-like member, means for guiding said membeer between a protracted position and a retracted position, and an actuator for selectively driving said member to and between said positions, wherein said member has a longitudinal groove, and said actuator has a driving wheel complementary to and engaging said member drivingly in said groove.

12. A radio system according to claim 11, including biasing spring means connected to said member for normally biasing said member toward the protracted position and adapted to be overecome by operation of said actuator for retracting said member.

13. An antenna system for a mobile radio, comprising an extendible metal hood ornament antenna means mounted on a vehicle front hood portion, antenna lead-in means with a feed lead connected to said extendible ornament, means for extending said extendible hood ornament mounted within the confines of the vehicle, a radio unit connected to said feed lead, wherein said metallic antenna means comprises a rod-like member, means for guiding said member between a protracted selectively driving said member to and between said positions, wherein said member has a longitudinal groove, and said actuator has a driving wheel complementary to and engaging said member drivingly in said groove.

14. An antenna system according to claim 13, including biasing spring means connected to said member for normally biasing said member toward the protracted position and adapted to be overcome by operation of said actuator for retracting said member.

15. An antenna system according to claim 13, wherein said front hold portion includes a dielectric ornament guide for said member.

* * * * *